United States Patent Office 3,541,090
Patented Nov. 17, 1970

3,541,090
PRODUCTION OF SUBSTITUTED TETRAHYDRO-1,4-THIAZINE-1,1-DIOXIDES
Heinz Herlinger and Karl Heinrich Mayer, Leverkusen, Germany, assignors to Farbenfabriken Bayer Aktiengesellschaft, Leverkusen, Germany, a corporation of Germany
No Drawing. Filed Mar. 1, 1968, Ser. No. 709,809
Claims priority, application Germany, Mar. 31, 1967, F 51,981
Int. Cl. C07d 93/10
U.S. Cl. 260—243                  6 Claims

ABSTRACT OF THE DISCLOSURE

Substituted tetrahydro - 1,4 - thiazine - 1,1 - dioxides are produced by reacting 1,4-thioxane-1,1-dioxide of the formula:

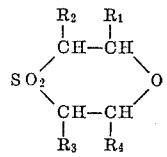

or bis-(β-hydroxyethyl)-sulfone of the formula:

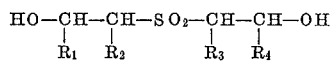

with at least the stoichiometrically required amount of a compound of the formula:

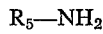

wherein $R_1$, $R_2$, $R_3$ and $R_4$ are the same or different hydrogen, alkyl, substituted alkyl, or $R_1$ with $R_2$ and $R_3$ with $R_4$ are components of a carbocyclic 6-membered ring system, and $R_5$ is $NH_2$, lower alkyl-NH—, an aliphatic moiety, a substituted aliphatic moiety, a cycloaliphatic moiety, a substituted cycloaliphatic moiety, aralkyl, substituted aralkyl, amino-alkyl, or aminoalkyl substituted 5 - or 6 - membered heterocyclic moiety at a temperature of from about 60° C. to about 100° C. in the presence of catalytic quantities of an inorganic base of an element of the first and second main group of the Periodic Table and the substituted aliphatic moiety is straight or branched chain alkyl of 1 to 18 carbon atoms, alkoxy of 1 to 4 carbon atoms or alkenyl substituted by —$NH_2$, OH, dialkylamino of 1 to 4 carbon atoms in each alkyl moiety, —$NH_2$ as part of a heterocyclic ring, or —$NH_2$ as a part of a heterocyclic ring having an oxygen, nitrogen or sulphur heteroatom or which is substituted by N-methyl-N-phenylamino, —COO-alkali or $SO_3$-alkali and recovering the 4-substituted tetrahydro-1,4-thiazine-1,1-dioxides produced.

These compounds are useful as intermediates for the production of dyestuffs and are also useful in the same manner as tertiary and secondary amines such as, for example, acid receptors, or in the case of secondary amines or hydrazines, for reaction with isocyanates to produce ureas or semicarbazides.

The present invention is concerned with substituted tetrahydro-1,4-thiazine-1,1-dioxides and their derivatives. More particularly, the present invention is concerned with 4-substituted tetrahydro - 1,4 - thiazine - 1,1-dioxides and their derivatives wherein one or more of the hydrogen atoms in the 2-, 3-, 5- and 6-positions may also be substituted.

It is known in the art to react 1,4-thioxane-1,1-dioxide, bis-(β-hydroxyethyl)-sulphone or their derivatives which are substituted on the 2, 3, 5 and 6 carbon atoms, with ammonia, primary aliphatic, cycloaliphatic, araliphatic amines or hydrazines in the presence of water or organic solvents at temperatures of from 100° C. to 300° C. to produce tetrahydro-1,4 - thiazine - 1,1-dioxides. German Pat. No. 1,123,326 teaches such a process. This known process, however, has a number of disadvantages, most important of which is that it requires high reaction temperatures. In German Pat. No. 1,123,326, all of the working examples indicate reaction temperatures of 150° C. or above. When it was attempted to scale up Example 12 of German Pat. No. 1,123,326 to industrial scale, which example teaches the reaction of an aqueous solution of hydrazine with 1,4-thioxane-dioxides in an autoclave at 150° C., decomposition occurred, both in the reaction product as well as in the material autoclaved and this led to a continuous increase of the pressure, finally necessitating the termination of the reaction. Such a result is not at all surprising since it is known that hydrazine is already decomposed by traces of metals.

The present invention provides novel 4-substituted tetrahydro - 1,4 - thiazine - 1,1 - dioxides and their derivatives above referred to which may be easily obtained without the attendant disadvantages of the prior art by reacting 1,4-thioxane-1,1-dioxides of the formula:

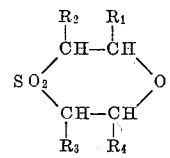

or bis-(β-hydroxyethyl)-sulphones of the formula:

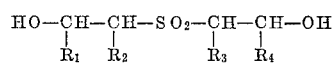

with at least the stoichiometrically required amount of a compound of the formula:

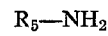

wherein $R_1$, $R_2$, $R_3$ and $R_4$ are the same or different hydrogen, alkyl, substituted alkyl, or $R_1$ with $R_2$ and $R_3$ with $R_4$ are components of a carbocyclic 6-membered ring system, and $R_5$ is $NH_2$, lower alkyl-NH—, an aliphatic moiety, a substituted aliphatic moiety, a cycloaliphatic moiety, a substituted cycloaliphatic moiety, aralkyl, substituted aralkyl, aminoalkyl, or aminoalkyl substituted 5- or 6-membered heterocyclic moiety at a temperature of from about 60° C. to about 100° C. in the presence of catalytic quantities of an inorganic base of an element of the first and second main group of the Periodic Table and the substituted aliphatic moiety is straight or branched chain alkyl of 1 to 18 carbon atoms, alkoxy of 1 to 4 carbon atoms or alkenyl substituted by —$NH_2$, OH, dialkylamino of 1 to 4 carbon atoms in each alkyl moiety, —$NH_2$ as part of a heterocyclic ring, or —$NH_2$ as a part of a heterocyclic ring having an oxygen, nitrogen or sulphur heteroatom or which is substituted by N - methyl - N - phenylamino, —COO-alkali or $SO_3$-alkali, in water and/or in a water-miscible solvent and recovering the 4-substituted tetrahydro-1,4-thiazine-1,1-dioxides produced.

Alkyl radicals which may be substituted are preferably those containing 1–4 carbon atoms, the total number of the carbon atoms $R_1$ to $R_4$ generally not exceeding 8. As substituents of the radicals $R_1$ to $R_4$, the following may be mentioned: alkoxy (preferably 1–4 carbon atoms), —O—$(CH_2)_2$—O-alkyl (preferably 1–4 carbon atoms in the alkyl radical), —O-alkenyl, such as —O-allyl, an optionally substituted phenoxy radical (the preferred substituents being halogens, $C_{1-3}$-alkyl, $NO_2$, CN), as well as $C_{1-4}$-dialkylamino or the corresponding dialkylamino-N-oxides, whereby the alkyl groups in the two last-mentioned cases may also be components of a heterocyclic ring system which may contain as further hetero atoms or groups oxygen, N-alkyl ($C_{1-4}$), S, SO or $SO_2$; as substituents of the radicals $R_1$–$R_4$, there may further be mentioned the optionally substituted N-alkyl ($C_{1-4}$)-aniline radical (preferred substituents being halogens, $NO_2$, alkyl or alkoxy with $C_{1-4}$), further —$SO_2$-alkyl ($C_{1-4}$) or —$SO_2$-phenyl, whereby the phenyl radical may be substituted by halogens, alkyl ($C_{1-4}$) or $NO_2$.

The 1,4-thioxane-1,1-dioxides or bis-($\beta$-hydroxyethyl)-sulphones used for the process according to the invention are known or they can be obtained according to known methods.

Optionally substituted aliphatic radicals for $R_5$ include straight-chain or branched alkyl radicals which contain 1–18, preferably 1–12, carbon atoms, and may also contain double bonds, preferably one double bond, as well as alkenyl moieties. Examples of the aliphatic radical also include alkoxy (preferably 1–4 carbon atoms), —$NH_2$, OH, $C_{1-4}$-dialkylamino, whereby the nitrogen atom may also be a component of a heterocyclic ring which may also contain as further hetero atoms oxygen, nitrogen or sulphur, N - methyl - N - phenylamino, —COO-alkali and $SO_3$-alkali, as substituents.

Optionally substituted cycloaliphatic radicals are those which contain 5–12, preferably 5, 6, 8 and 12, carbon atoms in the ring system. Substituents of these rings include particularly alkyl radicals containing preferably 1–4 carbon atoms.

Optionally substituted aralkyl radicals contain in the alkyl chain preferably 1–4 carbon atoms, whereas phenyl and naphthyl are preferred as aryl radicals. As substituents in the aryl radical, the preferred ones include the halogens (fluorine, chlorine, bromine, iodine), —COO-alkali as well as —$SO_3$-alkali.

There may also be considered as radicals $R_5$ optionally substituted aminoalkyl ($C_1$ or $C_2$) heterocycles with 5 or 6 ring members, whereby the heterocyclic ring may contain further hetero atoms, such as oxygen, nitrogen or sulphur, and whereby the hetero ring system may also be fused with an optionally substituted benzene ring. Substituents of such heterocyclic compounds are especially OH as well as alkyl (preferably 1–4 carbon atoms).

Examples of compounds $R_5$—$NH_2$ to be used for the process are, besides hydrazine and alkylamines as well as alkylhydrazine ($C_{1-3}$), the following:

cyclohexylamine,
cyclopentylamine,
cyclooctylamine,
cyclododecylamine,
hexahydrobenzylamine,
hexahydro-2-amino-toluene,
hexahydro-3-amino-toluene,
hexahydro-4-amino-toluene,
1-tert.-butyl-4-amino-cyclohexane,
ethylene-diamine,
propylene-diamine-1,2,
tetramethylene-diamine-1,4,
hexamethylene-diamine-1,6,
N,N-dimethylethylene-diamine,
N,N-dimethyl-propylene-diamine-1,3,
N-aminoethylmorpholine,
4-($\beta$-aminoethyl)-tetrahydro-1,4-thiazine-1,1-dioxide,
N-methyl-N'-($\beta$-aminoethyl)-piperazine,
ethanolamine,
2-hydroxy-propylamine-(1),
3-hydroxy-propylamine-(1),
3-amino-2-methyl-propanol-1,
2-amino-2-methyl-propanediol-1,3,
1-amino-butanol-(3),
3-methoxy-propylamine-(1),
3-ethoxy-propylamine-(1),
3-butoxy-propylamine-(1);

sodium or potassium salts of aminoacetic acid, 4-aminobutyric acid,
6-aminocaproic acid,
12-aminolauric acid or 2-aminoethane-sulphonic acid;
benzylamine,
4-chlorobenzylamine,
3,4-dichlorobenzylamine,
4-amino-benzylamine,
$\beta$-phenylethylamine,
$\alpha$-phenylethylamine,
$\alpha$-1-naphthylamine,
$\alpha$-2-naphthylamine,
4-aminomethyl-benzene-sulphonic acid sodium salt,
as well as furfurylamine,
2-aminomethyl-thiophene,
2-aminomethyl-thiazole,
2-methyl-4-aminomethyl-oxazole,
2-aminomethylpyridine,
3-aminomethylpyridine,
4-aminomethyl-pyridine,
2-($\beta$-aminoethyl)-pyridine,
2-aminomethylbenzoxazole,
2-methyl-4-hydroxy-5-aminomethyl-pyridine,
2,3-dihydroxy-7-aminomethylquinoxaline or
2-($\beta$-aminoethyl)-quinazolone-(4).

In the above-described process, at least the equimolar amount of an amine of the formula $R_5$—$NH_2$ should be used and it is sometimes expedient to use the amine in a molar excess of up to about 5. The temperature range of the reaction is from about 60° C. to about 100° C. and the preferred range is from about 80° C. to about 95° C., under atmospheric pressure.

The inorganic bases of elements of the first and second main groups of the Periodic Table are used to yield hydroxyl ions in the presence of water. Particularly preferred bases are the oxides, hydroxides, carbonates or bicarbonates, particularly those of lithium, sodium, potassium, calcium, magnesium and strontium. They are preferably used in the form of their aqueous solution. In general, the inorganic base is used in amounts of from about 0.01% to about 10% and preferably from about 0.1% to about 6% by weight based on the thioxanedioxide or the bis-($\beta$-hydroxyethyl)-sulphone compound to be reacted. Solvents for the process according to the invention are, besides water, for example: alcohols, such as methyl alcohol, ethyl alcohol, isopropyl alcohol, butyl alcohol and ethylene glycol; ethers, such as dioxan, glycomonomethyl ether. The use of mixtures of water and water-miscible solvents is especially expedient when the organic bases to be reacted, e.g., n-dodecylamine, are only slightly soluble in water alone.

The process above described is particularly useful for the production of 4-amino-tetrahydro-1,4-thiazine-1,1-dioxides and derivatives substituted on the one or more of the 2, 3, 5 or 6 carbon atoms, but is very useful too for preparing the other 4-substituted compounds.

The dioxides are worked up in conventional manner. When compounds are used in which $R_5$ contains a —COO-alkali or —$SO_3$-alkali, then the free compound is obtained by acidification after reaction is completed. This is carried out in the usual manner by using an inorganic acid, such as hydrochloric acid or sulphuric acid, or by means of a liquid organic acid, e.g., acetic acid.

The compounds of the present invention are useful as intermediates for the production of dyestuffs, the final dyestuffs being produced by reacting the compounds of the present invention in a manner per se known. The compounds of the present invention are also useful, as is known from tertiary and secondary amines, as acid receptors and as is the case with secondary amines and hydrazines, the compounds of the present invention can be reacted with isocyanates to produce ureas or semicarbazides, according to procedures and techniques which are per se known. Further the compounds obtainable according to the process of this invention can be used as oil-additives as described for the compounds of German Patent Specification 1,123,326.

The substituted tetrahydro-1,4-thiazine-1,1-dioxides are furthermore very important as starting materials for the processes described in German Patent Specification 1,170,957 and French Patent Specification 1,507,525.

EXAMPLE 1

4-amino-tetrahydro-1,4-thiazine-1,1-dioxide 272 g. (2 mol) 1,4-thioxane-1,1-dioxide are heated at boiling temperature for 3 hours in a solution of 15 ml. of a concentrated sodium hydroxide solution and 150 ml. (3 mol) 100% hydrazine hydrate in 350 ml. of water. The solution is completely evaporated in a water jet vacuum and the residue is recrystallized from methanol. 205 g. of colorless crystals of M.P. 110° C.–113° C. are obtained.

EXAMPLE 2

3-methyl-4-amino-tetrahydro-1,4-thiazine-1,1-dioxide 150 g. (1 mol) 3-methyl-1,4-thioxane-1,1-dioxide are heated at boiling temperature for 3 hours in a solution of 250 ml. of water, 10 ml. of a concentrated sodium hydroxide solution and 75 ml. 100% hydrazine hydrate. The aqueous solution of the reaction product is completely evaporated in a water jet vacuum and the residue recrystallized from 170 ml. methanol. There are obtained 132–134 g. (80%–82% of theory) of colorless crystals with a melting point of 119° C.–120° C.

The 3-methyl-1,4-thioxane-1,1-dioxide (M.P. 107° C.–109° C.) used as starting product was prepared from 2-hydroxyethyl-2-hydroxypropyl-sulphide by oxidation with hydrogen peroxide and ring closure in alkaline solution.

EXAMPLE 3

2,3-dimethyl-4-amino-tetrahydro-1,4-thiazine-1,1-dioxide 164 g. (1 mol) 2,3-dimethyl-1,4-thioxane-1,1-dioxide are heated at 80° C.–100° C. for 4 hours in a solution of 150 ml. hydrazine hydrate (100°), 150 ml. water and 10 ml. of a concentrated sodium hydroxide solution, and the product is worked up in accordance with Example 1. There are obtained 141 g. 2,3-dimethyl-4-amino-tetrahydro-1,4-thiazine-1,1-dioxide, corresponding to about 79% of theory. After twice recrystallizing from methanol, this compound melts at 112° C.–115° C.

*Analysis.*—Calculated for $C_6H_{14}N_2O_2S$ (178) (percent): C, 40.44; H, 7.92; N, 15.72. Found (percent): C, 40.43; H, 7.96; N, 15.68.

Starting product: 2,3-dimethyl-1,4-thioxane-1,1-dioxide (B.P. 113° C./0.05 mm. Hg) prepared from 2-hydroxyethyl-2'-hydroxy-isobutyl-sulphide by oxidation with hydrogen peroxide and ring closure in a dilute sodium hydroxide solution. 2-hydroxyethyl-2'-hydroxy-isobutyl-sulphide (B.P. 170° C./14 mm. Hg) prepared from butylene-oxide(2) and mercaptoethanol.

EXAMPLE 4

3,5-dimethyl-4-amino-tetrahydro-1,4-thiazine-1,1-dioxide 68 g. 3,5-dimethyl-1,4-thioxane-1,1-dioxide are heated at boiling temperature for 5 hours in a solution of 10 ml. of a concentrated sodium hydroxide solution and 125 ml. 100% hydrazine hydrate in 125 ml. of water. Upon cooling, a colorless product crystallizes out from the clear solution, which is filtered off with suction and washed with methanol. The yield amounts to 45 g. of M.P. 172° C.–175° C. after redissolution from methanol.

*Analysis.*—Calculated for $C_6H_{14}N_2O_2S$ (178) (percent): C, 40.44; H, 7.92; N, 15.72. Found (percent): C, 40.43; H, 7.96; N, 15.90.

EXAMPLE 5

3-methoxymethyl-4-amino-tetrahydro-1,4-thiazine-1,1-dioxide 37 g. 3-methoxymethyl-1,4-thioxane-1,1-dioxide are heated at boiling temperature for 5 hours in a solution of 4 ml. of a concentrated sodium hydroxide solution and 50 ml. 100% hydrazine hydrate in 50 ml. water. The solution is completely evaporated in a water jet vacuum and the residue dissolved in methanol. Upon treating with concentrated hydrochloric acid, the hydrochloride crystallizes out. 30 g. of colorless crystals of M.P. 225° C. are obtained. After redissolution from water, the melting point is 233° C. If it is desired to obtain the free base, then the evaporation residue is mixed with hot benzene whereby the reaction product dissolves. By evaporation, a colorless oil is obtained which slowly crystallizes through. Starting products:

3-methoxymethyl-1,4-thioxane-1,1-dioxide (M.P. 66–68° C.) prepared from 2-hydroxyethyl-2'-hydroxy-3'-methoxy-propylsulphide by oxidation with hydrogen peroxide and ring closure in a dilute sodium hydroxide solution.

2-hydroxyethyl-2'-hydroxy-3'-methoxy-propyl-sulphide (B.P. 131° C.–125° C./1.4 mm. Hg) prepared from 1,2-epoxy-3-methoxypropane and mercaptoethanol.

EXAMPLE 6

3-methylsulphonylmethyl-4-amino-tetrahydro-1,4-thiazine-1,1-dioxide 48 g. 3-methylsulphonylmethyl-1,4-thioxane-1,1-dioxide are heated at boiling temperature for 5 hours in a solution of 5 ml. of a concentrated sodium hydroxide solution and 50 ml. 100% hydrazine hydrate in 50 ml. water.

Upon cooling, there crystallizes from the clear solution a colorless product which is filtered off with suction, washed with water and recrystallized from 300 ml. water. Yield 42 g., M.P. 205° C.–207° C.

Starting products: 3-methylsulphonylmethyl-1,4-thioxane-1,1-dioxide (M.P. 200° C.) prepared from 2-hydroxyethyl-2'-hydroxy-3'-methylmercapto-propyl-sulphide by oxidation with hydrogen peroxide and ring closure in a dilute sodium hydroxide solution.

2-hydroxyethyl-2'-hydroxy-3'-methylmercapto-propyl-sulphide (B.P. 155° C.–160° C./0.08 mm. Hg) prepared from 1,2-epoxy-3-methylmercapto-propane and mercaptoethanol.

The following compounds are obtained in an analogous manner to that described in Examples 1 to 6:

2-methyl-4-amino-tetrahydro - 1,4 - thiazine-1,1-dioxide, M.P. 96° C.–98° C.

2,5-dimethyl-4-amino-tetrahydro - 1,4-thiazine-1,1-dioxide, M.P. 103° C.–105° C.

2,3,5-trimethyl-4-amino-tetrahydro - 1,4 - thiazine - 1,1-dioxide, M.P. 139° C.–141° C.

2,3,5,6-tetramethyl-4-amino-tetrahydro - 1,4-thiazine-1,1-dioxide-hydrochloride, M.P. 237° C. with decomposition 2,3-tetramethylene-4-amino-tetrahydro - 1,4-thiazine-1,1-dioxide, M.P. 114° C.–116° C.

3-ethoxymethyl-4-amino-tetrahydro - 1,4 - thiazine-1,1-dioxide-hydrochloride, M.P. 191° C.–192° C.

3-allyloxy-methyl-4-amino-tetrahydro - 1,4 - thiazine-1,1-dioxide, a not distillable oil 3-β-methoxy-ethyl-oxy-methyl - 4 - amino-tetrahydro-1,4-thiazine-1,1-dioxide, M.P. 75° C.–80° C.

3-phenoxymethyl-4-amino-tetrahydro - 1,4 - thiazine-1,1-dioxide, M.P. 105° C.–107° C.

3-methyl-5-methoxymethyl - 4 - amino-tetrahydro - 1,4-thiazine-1,1-dioxide-hydrochloride, M.P. 219° C. with decomposition 4-methylamino-tetrahydro - 1,4-thiazine-1,1-dioxide, M.P. 190° C.
3-n-butylsulphonyl-methyl - 4 - amino - tetrahydro - 1,4-thiazine-1,1-dioxide, M.P. 118° C.–120° C.
3-dimethylamino-methyl - 4 - amino - tetrahydro - 1,4-thiazine-1,1-dioxide, M.P. 129° C.–131° C.

EXAMPLE 7

4-ethyl-tetrahydro-1,4-thiazine-1,1-dioxide 68 g. thioxane-dioxide (0.5 mol) are added to a solution of 65 g. ethylamine/water (40%), 100 ml. ethyl alcohol and 10 ml. of a concentrated sodium hydroxide solution and the mixture is boiled under reflux under normal pressure for 6 hours. The boiling temperature is 82° C. After cooling, 13 ml. of a concentrated hydrochloric acid are added to neutralize the sodium hydroxide solution followed by evaporation at a bath temperature of 80° C. in a water jet vacuum. To remove the sodium chloride, the residue is extracted three times with portions of 100 ml. chloroform and filtered. After distilling off the solvent, an oily residue is obtained which boils in a vacuum at 0.07 mm. Mg at 104° C. The distillate completely solidifies and has a melting point of 40° C.–42° C. after recrystallization from isopropanol; yield 68 g.=83% of theory.

Analysis.—Calculated for $C_6H_{13}NO_2$ (163.24) (percent): C, 44.15; H, 8.03; N, 8.58; S, 19.64; O, 19.60. Found (percent): C, 44.0; H, 8.20; N, 8.50; S, 19.20; O, 19.90.

EXAMPLE 8

4-(2'-hydroxyethyl)-tetrahydro-1,4-thiazine-1,1-dioxide 68 g. thioxane-dioxide (0.5 mol) are heated under reflux for 6 hours with 150 ml. water, 10 ml. of a concentrated sodium hydroxide solution and 34 g. ethanolamine. After the addition of 13 ml. of a concentrated sodium hydroxide solution in the cold, the mixture is evaporated in a vacuum, taken up in chloroform and distilled as in the preceding examples: boiling point 170° C.–180° C./0.05 mm. Hg, yield 81 g.=90% of theory. The substance melts at 74° C. after recrystallization from isopropanol.

Analysis.—Calculated for $C_6H_{13}NO_3S$ (179.24) (percent): C, 40.20; H, 7.31; N, 7.82; O, 26.78; S, 27.89. Found (percent): C, 40.30; H, 7.60; N, 7.70; O, 26.80; S, 17.90.

EXAMPLE 9

Starting from 3-methyl-thioxane-1,1-dioxide, there is obtained in an analogous manner the corresponding 4-(β-hydroxyethyl)-tetrahydro-1,4-thiazine-1,1-dioxide in a yield of 90%; B.P. 170° C./0.2 mm. Hg; M.P. 48° C.

Analysis.—Calculated for $C_7H_{15}NO_3S$ (193.26) (percent): C, 43.50; H, 7.82; N, 7.25; O, 24.84. Found (percent): C, 43.30; H, 8.10; N, 7.10; O, 24.90.

EXAMPLE 10

4-n-butyl-tetrahydro-1,4-thiazine-1,1-dioxide 34 g. thioxane-dioxide (0.25 mol) are boiled under reflux for 9 hours with 20 g. n-butylamine (90%) in 70 ml. dioxan and 5 ml. of a concentrated sodium hydroxide solution. After cooling the mixture to 0° C., it is mixed with 6.5 ml. of a concentrated sodium hydroxide solution and evaporated to dryness in a vacuum. The product is taken up three times in 100 ml. chloroform each time, filtered from sodium chloride and distilled in a high vacuum; B.P. 121° C.–125° C./0.04 mm. Hg; yield 42 g=88% of theory.

Analysis.—Calculated for $C_8H_{17}NO_2S$ (191.3) (percent): C, 50.23; H, 8.96; N, 7.32; O, 16.73. Found (percent): C, 49.9; H, 8.9; N, 7,4; O, 17.1.

EXAMPLE 11

4-n-dodecyl-tetrahydro-1,4-thiazine-1,1-dioxide 17 g. thioxane-dioxide (0.125 mol) are added to a solution of 24 g. dodecylamine, 50 ml. n-butanol and 2.5 ml. of a concentrated sodium hydroxide solution and the mixture is heated under reflux for 9 hours. After cooling to 0° C., the resultant crystals are filtered off with suction and recrystallized from isopropanol; M.P. 82° C. Yield 31.5 g.=83% of theory.

Analysis.—Calculated for $C_{16}H_{33}NO_2S$ (303.50) (percent): C, 63.31; H, 10.96; N, 4.62; O, 10.54. Found (percent): C, 63.9; H, 11.3; N, 4.6; O, 10.8.

EXAMPLE 12

4-benzyl-tetrahydro-1,4-thiazine-1,1-dioxide 68 g. thioxane-dioxide (0.5 mol) are boiled under reflux for 4 hours, while stirring, together with 55 g. benzylamine, 200 ml. ethyl alcohol and 10 ml. of a concentrated potassium hydroxide solution. By the addition of 10 ml. of concentrated hydrochloric acid, the potassium hydroxide solution is largely neutralized. The reaction mixture is evaporated to dryness in a vacuum and the product is recrystallized from isopropanol; M.P. 77° C.–78° C.; yield 79 g.=70% of theory. The compound has in the vacuum (0.18 mm. Hg) a boiling point of 207° C.

Analysis.—Calculated for $C_{11}H_{15}NO_2S$ (225.20) (percent): C, 58.66; H, 6.71; N, 6.22; O, 14.21. Found (percent): C, 58.3; H, 7.1; N, 6.3; O, 14.5.

EXAMPLE 13

4-(2'-diethylamino-ethyl)-tetrahydro-1,4-thiazine-1,1-dioxide 34 g. thioxane-dioxide (0.25 mol) are heated at 82° C. for 8 hours with 35 g. N,N-diethyl-ethylene-diamine in 70 ml. ethyl alcohol and 5 ml. of a concentrated sodium hydroxide solution. After the addition of 6.5 ml. concentrated hydrochloric acid, working up is carried out as described in the preceding examples. Boiling point 145° C.–150° C./0.05 mm. Hg; yield 51 g.=87% of theory.

Analysis.—Calculated for $C_{10}H_{22}N_2O_2S$ (234.30) (percent): C, 51.26; H, 9.46; N, 11.96; O, 13.66. Found (percent): C, 51.3; H, 9.7; N, 12.0; O, 13.7.

We claim:
1. In a process for the production of 4-substituted tetrahydro-1,4-thiazine-1,1-dioxide which comprises reacting:
(a) 1,4-thioxane-1,1-dioxide of the formula:

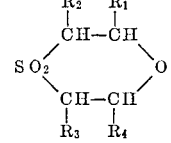

or, (b) bis-(β-hydroxyethyl)-sulphones of the formula:

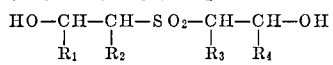

with (c) at least the stoichiometrically required amount of a compound of the formula:

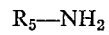

wherein $R_1$, $R_2$, $R_3$ and $R_4$ are the same or different and consist of hydrogen, lower alkyl, or lower alkyl substituted by lower alkoxy groups and $R_5$ consists of lower alkyl, amino, or lower alkylamino, at a temperature of from about 60° C. to about 100° C. the improvement which comprises carrying out the reaction in the presence of catalytic quantities of an inorganic base of an element of the first and second main group of the Periodic Table and recovering the 4-substituted tetrahydro-1,4-thiazine-1,1-dioxide produced.

2. A process according to claim 1 wherein the substituted lower alkyl contains 1 to 4 carbon atoms in the alkyl moiety and the total number of carbon atoms in $R_1$ to $R_4$ does not exceed 8.

3. A process according to claim 1 wherein the $R_5$ substituent lower alkylamino contains 1 or 2 carbon atoms in the alkyl moiety.

4. A process improvement according to claim 1 wherein the compound represented by $R_5$—$NH_2$ is selected from the group consisting of ammonia, hydrazine, alkylamines, phenylhydrazine, cyclohexylamine, cyclopentylamine, cyclooctylamine, cyclododecylamine, hexahydrobenzylamine, hexahydro-2-amino-toluene, hexahydro-3-amino-toluene, hexahydro-4-amino-toluene, 1-tert.-butyl-4 - amino-cyclohexane, ethylene-diamine, propylene-diamine-1,2, tetramethylene-diamine-1,4, hexamethylene-diamine - 1,6, N,N-dimethylethylene-diamine, N,N-dimethyl-propylene-diamine-1,3, N - aminoethylmorpholine, 4-(β-aminoethyl) - tetrahydro - 1,4-thiazine-1,1-dioxide, N-methyl-N' - (β-aminoethyl)-piperazine, ethanolamine, 2 - hydroxy-propylamine-(1), 3 - hydroxy-propylamine-(1), 3 - amino - 2-methyl-propanol-1, 2-amino-2-methyl-propanediol-1,3, 1 - amino-butanol-(3), 3 - methoxy-propylamine-(1), 3 - ethoxy-propylamine-(1), 3-butoxy-propylamine-(1); sodium or potassium salts of aminoacetic acid, 4-amino-butyric acid, 6-aminocaproic acid, 12-aminolauric acid or 2-aminoethane-sulphonic acid; benzylamine, 4 - chlorobenzylamine, 3,4-dichlorobenzylamine, 4-amino-benzylamine, β-phenylethylamine, α-phenylethylamine, α-1 - naphthylamine, α-2-naphthylamine, 4 - aminomethyl-benzene-sulphonic acid sodium salt as well as furfurylamine, 2-amino-methyl-thiophene, 2-aminomethyl-thiazole, 2 - methyl - 4 - aminomethyl-oxazole, 2-aminomethylpyridine, 3 - aminomethylpyridine, 4-aminomethyl-pyridine, 2-(β-aminoethyl)-pyridine, 2-aminomethyl-benzoxazole, 2-methyl - 4 - hydroxy-5-aminomethyl-pyridine, 2,3-dihydroxy - 7 - aminomethyl-quinoxaline or 2-(β-aminoethyl)-quinazolone-(4).

5. A process improvement according to claim 2 wherein the alkyl moiety is substituted by alkoxy of 1 to 4 carbon atoms.

6. A process according to claim 3 wherein the catalyst is an oxide, hydroxide, carbonate or bicarbonate of lithium, sodium, potassium, calcium, magnesium or strontium.

References Cited

UNITED STATES PATENTS

| 3,202,657 | 8/1965 | Kuhne et al. | 260—243 |
| 3,383,379 | 5/1968 | Wallace et al. | 260—243 |

FOREIGN PATENTS

| 1,507,525 | 11/1967 | France. |
| 1,123,326 | 8/1962 | Germany. |
| 1,170,957 | 12/1964 | Germany. |

HENRY R. JILES, Primary Examiner

J. M. FORD, Assistant Examiner

U.S. Cl. X.R.

8—34; 252—51.5; 260—553, 554